US009376565B2

(12) United States Patent
Subotic et al.

(10) Patent No.: US 9,376,565 B2
(45) Date of Patent: Jun. 28, 2016

(54) ASPHALT COMPOSITIONS HAVING IMPROVED PROPERTIES AND RELATED COATINGS AND METHODS

(71) Applicant: Henry Company LLC, El Segundo, CA (US)

(72) Inventors: Dusan V. Subotic, Toronto (CA); Larisa Kasaitskaya, Toronto (CA); Shawn Melancon, Toronto (CA)

(73) Assignee: Henry Company, LLC, El Segundo, CA (US)

( * ) Notice: Subject to any disclaimer, the term of this patent is extended or adjusted under 35 U.S.C. 154(b) by 165 days.

(21) Appl. No.: 13/690,319

(22) Filed: Nov. 30, 2012

(65) Prior Publication Data

US 2013/0136855 A1    May 30, 2013

Related U.S. Application Data

(60) Provisional application No. 61/565,215, filed on Nov. 30, 2011.

(51) Int. Cl.
| | | |
|---|---|---|
| *C08L 95/00* | (2006.01) | |
| *C08L 101/00* | (2006.01) | |
| *C08K 5/053* | (2006.01) | |

(52) U.S. Cl.
CPC .............. *C08L 95/00* (2013.01); *C08K 5/053* (2013.01); *C08L 101/00* (2013.01)

(58) Field of Classification Search
CPC ....... C08K 5/053; C08L 95/00; C08L 101/00; C09D 195/00; C09D 7/12; C09D 201/00; C04B 41/48; E01C 7/35; E01C 19/48; E01C 21/00
USPC ................................ 524/59, 68–71; 427/138
See application file for complete search history.

(56) References Cited

U.S. PATENT DOCUMENTS

| | | | |
|---|---|---|---|
| 2,420,082 A | | 5/1947 | Klinger |
| 2,848,429 A | | 8/1958 | Woodruff et al. |
| 3,285,871 A | * | 11/1966 | Carlson ........................... 524/71 |
| 4,569,968 A | * | 2/1986 | Uffner et al. ................. 525/54.5 |
| 4,650,820 A | * | 3/1987 | Decroix .......................... 524/69 |
| 4,818,367 A | * | 4/1989 | Winkler ........................... 208/23 |
| 4,902,349 A | | 2/1990 | Wakizaka et al. |
| 5,713,996 A | * | 2/1998 | Morris ............... C09D 195/005 |
| | | | 106/277 |
| 5,986,010 A | | 11/1999 | Clites et al. |
| 6,403,659 B1 | * | 6/2002 | Boyer ..................... C08L 95/00 |
| | | | 106/277 |
| 7,625,963 B2 | * | 12/2009 | Wang et al. ..................... 524/68 |
| 7,851,523 B2 | * | 12/2010 | Lee et al. ........................ 524/62 |
| 2002/0042477 A1 | | 4/2002 | Jelling et al. |
| 2005/0107521 A1 | * | 5/2005 | Sasagawa et al. ............. 524/571 |
| 2005/0171251 A1 | * | 8/2005 | Nakajima et al. ............... 524/59 |
| 2008/0182925 A1 | | 7/2008 | Wang et al. |
| 2008/0241472 A1 | | 10/2008 | Shiao et al. |
| 2009/0264561 A1 | | 10/2009 | Carlson |
| 2009/0294032 A1 | | 12/2009 | Smith |
| 2010/0056674 A1 | | 3/2010 | Morifusa |
| 2010/0203336 A1 | | 8/2010 | Shiao et al. |

FOREIGN PATENT DOCUMENTS

| | | |
|---|---|---|
| CN | 101684199 | 3/2010 |
| DE | 2331727 | 1/1975 |
| DE | 2509473 | 9/1976 |
| WO | WO 88/07067 | 9/1988 |

OTHER PUBLICATIONS

Stepanpol Polyol Brochure—Jul. 22, 2015.*
Duroplastic.com website—Jul. 24, 2015.*

* cited by examiner

*Primary Examiner* — Randy Gulakowski
*Assistant Examiner* — Christopher M Rodd
(74) *Attorney, Agent, or Firm* — Baker & Hostetler LLP

(57) ABSTRACT

The invention includes a composition to coat a substrate comprising: an asphalt material; a polymer that is not a polyol; and a polyol. The polyol has a molecular weight of about 1000 to about 5000 and/or the polyol is present in an amount no greater than about 30% by weight of the total composition. Also included are coated articles that comprise a substrate coated with a coating layer, wherein the coating layer is formed from a composition that comprises: an asphalt material, a polymer that is not a polyol; and a polyol. Also included are methods of improving the processability of a asphalt material comprising combining together an asphalt material, a polymer that is not a polyol, and a polyol, wherein the resultant composition exhibits improved processability as compared to an asphalt composition that does not contain a polyol. In the method in some embodiments, the polyol may be present in the resultant composition in an amount of no greater than 30% by weight and/or the polyol may have a molecular weight of about 1000 to about 5000. In some embodiments, the composition of the method does not contain at least one of a plasticizer and a surface active agent.

11 Claims, No Drawings

ASPHALT COMPOSITIONS HAVING IMPROVED PROPERTIES AND RELATED COATINGS AND METHODS

CROSS-REFERENCE TO RELATED APPLICATION

This application claims the benefit under 35 U.S.C. §119 (e) to U.S. Provisional Patent Application No. 61/565,215, filed Nov. 30, 2011, entitled "Asphalt Compositions Having Improved Properties and Related Coatings and Methods," the entire disclosure of which is incorporated herein by reference.

BACKGROUND OF THE INVENTION

Asphalt or bitumen is a mixture of various hydrocarbons and contains varying amounts of paraffinic, naphthenic, and aromatic hydrocarbons. It has properties which make it useful in a number of applications including as a surface application to a road bed or road surface, a sealing compound, a coating material, a waterproofing material. It may also be used to protect building structures or components of building structures, and as a caulking or waterproofing material.

Neat bitumen generally has little or no elasticity. Thus, asphalt processing is difficult and resultant coatings or pavement layers comprised of bitumen are brittle at low temperatures and soft at higher temperatures. Numerous products have been developed in an attempt to modify the bitumen and provide it with elasticity, reduced brittleness and increased processability. Such attempts include blending the bitumen with amounts of various polymers, most commonly SBS. The objective of using polymers as bitumen additives is to alter the viscoelastic properties of bitumen, in particular to extend the plasticity range and to improve the elastic restoration. These materials are commonly referred to as "polymer modified bitumens" (PMBs).

The process of preparing PMBs requires heating and shear mixing of the polymer and the bitumen which give the high viscosity of the bitumen, requires application of significant shear rates, relatively high temperatures in the reactors, and longer processing times.

While PMBs have been considered an improvement over neat bitumens, the end products still lack sufficient flexibility, particularly at lower temperatures (such as those present during most road maintenance operations). Moreover, the difficulties associated with the processing of PMB remain a challenge.

U.S. Pat. No. 4,902,349 to Wakizaka describes the difficulties associated with the mixing of asphalt and a polyol, reporting that asphalt separates from the polyol because of poor compatibility. To overcome this difficulty, Wakizaka uses high levels of polyol (40% by weight or greater) and requires use of a surface active agent and a plasticizer. Wakizaka teaches that its composition is prepared by "utilizing the behavior of a plasticizer according to the polymer solution theory and the surface-modifying effect of the plasticizer according to surface chemistry." The Wakizaka method and composition are flawed and commercial infeasible because of the costs added by use of the large amount of polyol and the additional required ingredients. There remains a need in the art for a lower cost flexible asphalt that can be used commercially in large quantities without being cost prohibitive.

BRIEF SUMMARY OF THE INVENTION

The invention includes a composition to coat a substrate comprising: an asphalt material; a polymer that is not a polyol; and a polyol. The polyol has a molecular weight of about 1000 to about 5000 and/or the polyol is present in an amount no greater than about 30% by weight of the total composition. Also included are coated articles that comprise a substrate coated with a coating layer, wherein the coating layer is formed from an composition that comprises: an asphalt material, a polymer that is not a polyol; and a polyol. In some embodiments, the polyol of the composition of the coated article has a molecular weight of about 1000 to about 5000 or it may be present in an amount no greater than 30% by weight of the total composition (before the composition is cured).

Also included are methods of improving the processability of a asphalt material comprising combining together an asphalt material, a polymer that is not a polyol, and a polyol, wherein the resultant composition exhibits improved processability as compared to an asphalt composition that does not contain a polyol. In the method in some embodiments, the polyol may be present in the resultant composition in an amount of no greater than 30% by weight and/or the polyol may have a molecular weight of about 1000 to about 5000. In some embodiments, the composition of the method does not contain at least one of a plasticizer and a surface active agent.

Methods of improving flexibility of a cured asphalt coating comprising incorporating together an asphalt material, a polymer that is not a polyol, and a polyol to form an composition, applying the composition to a substrate and curing, to form a coating layer, wherein the coating layer exhibits improved flexibility at temperatures below 0° C. as compared to an asphalt composition that does not contain a polyol are also disclosed.

DETAILED DESCRIPTION OF THE INVENTION

The above-described drawbacks are addressed by the invention, which encompasses compositions, coating layers and products formed from the compositions, and substrates or surfaces, particularly roadbeds and building materials, that are coated with the coating layer. Also included within the scope of the invention are methods of increasing the flexibility, for example, at temperatures below about 0° C., of an asphalt coating and methods of increasing the processability of asphalt-containing compositions. Once formed and cured, the coating layer provides to the substrate or surface waterproofing properties and protection from physical damage.

It has been found that a composition containing an asphalt material, a polymer and a polyol exhibits improved processability and improved flexibility when cured, which in turn results in increased durability and reduced delamination of the asphalt composition coating, properties that may be particularly desirable when the material is used in road beds or to coat other building and infrastructure materials and components. Advantageously, it has been discovered that these properties are achieved through relatively minimal loading of polymer and polyol as compared to the amount of asphalt and other materials in the composition, reducing the costs of the overall material and of processing.

The composition of the invention includes an asphalt or bituminous material that may form a flexible barrier or coating when cured. The asphalt material may include any known or to be developed in the art. It may be added to the composition in the form of a pre-mixed asphalt composition or as neat asphalt. Any asphalt may be selected; it may be preferred that the asphalt has a low oil content. For example, the composition of the invention may include a de-asphaltized "DA" grade asphalt. As is understood in the art, DA grade asphalt originates from "straight-run" asphalt that is formed from the distillation bottoms in crude oil refining. The DA asphalt is produced by solvent extracting remaining oil from straight-run asphalt.

Depending on the processing method(s) chosen to produce the composition and/or to coat the substrate, the asphalt selected as the barrier-forming material may be of a penetration grade ("pen grade") at 25° C., when tested according to ASTM method D 5, of about 0.5 to about 30, alternatively about 1 to about 20, or about 3 to about 15 (all at 25° C.). Similarly, it may be desirable to that the selected asphalt has a softening point of about 62° C. to about 95° C.

The asphalt content may be varied in an inverse manner with respect to the other components along similar guideline, i.e., the asphalt content must not be so high that the composition cannot be processed, nor so low that it cannot provide a film or layer in the desired application. As an example, the total asphalt in the composition may be an amount of about 85 wt % to about 15 wt % or about 70 wt % to about 50 wt % of the composition or about 60 wt % to about 65 wt % of the composition.

The composition also contains a polymer, copolymer or polymer blend (hereinafter, referred to collectively as "polymer" or "polymers") that is not a polyol. Any polymer that fits this definition and is capable of altering the asphalt's viscoelastic properties, however incrementally, may be used. For example, the selected polymer may be capable of increasing the bitumen's plasticity range, i.e., the difference between the material's softening point and its failure point, of improving the material's elastic restoration, and/or of increasing the material's ductility.

Suitable polymer(s) may include a natural rubber, a synthetic rubber, a thermoplastic rubber, a styrene butadiene styrene (SBS), an ethylene vinyl acetate (EVA), a thermosetting polymer, a thermoplastic polymer, an acrylic polymer, a polyurethane polymer, a styrenated-acrylic polymer, a duroplastic resin, a styrene/butadiene copolymer, an EPDM copolymer, atactic polypropylene and mixtures thereof. Polymers based on (meth)acrylic acid esters, particularly polymers of alkylmethacrylic acid esters (PAMAs) may also be used. Other polymers include those described in, for example, German Patent No. 25 09 473, Japan Patent No. 52-141,829, and PCT application No. 88/07 067, the contents of each of which are incorporated herein by reference.

The polymer may be added directly to the composition. Alternatively, pre-made asphalt/polymer blends ("polymer modified bitumens") may be used. Polymer-modified bitumens available commercially include CARABIT (styrene-butadiene modified, available from Shell Chemical), OLE-XOBIT (EPDM modified, available from British Petroleum), STYREL (styrene-butadiene modified, available from Elf). Other suitable polymer modified bitumen include, for example, those disclosed in U.S. Pat. Nos. 2,420,082, 2,848, 429, Ger. AS 12 40 773, and 23 31 727, the contents of each of which are incorporated herein by reference.

The polymer may be present in the composition in any amount sufficient to modify the bitumen's properties, as desired. For example, it may be present in the composition in an amount of no greater than about 50%, no greater than about 40%, no greater than about 30%, no greater than about 20%, no greater than about 15%, no greater than about 10%, no greater than about 7%, no greater than about 5%, and/or no greater than about 3% by weight of the total composition.

In one embodiment, the polymer is present in an amount of about 3.5% to about 15% by weight of the total composition, or about 5% to about 12% by weight of the total composition.

The composition also includes a polyol. The polyol may be any known or to be developed in the art, although it may be preferred that the polyol is in a liquid state at room temperature and/or that the polyol has a molecular weight of about 500 to about 7000, or about 1000 to about 5000. Suitable polyols may include a monomeric polyol, a polyether polyol, a natural polyol, a polyester polyol, pentaerythritol, ethylene glycol, glycerin, polyethylene glycol, polypropylene glycol, and poly(tetramethylene ether) glycol, polypropylene glycol, polyethylene nonyl phenol, and hydroxyl-terminated polybutadiene and mixture thereof. Polyols may be obtained from, for example, Carpenter Co., Dow Chemicals, Huntsman, Bayer, BASF, SKC etc.

It has been discovered that one may achieve a composition that has the desired processing and end product flexibility, by which is easier to compound and cost effective when the polyol is included in the composition in an amount of no greater than about 30% by weight of the of the total composition. It some circumstances, it may be desirable that the polyol is included in an amount of no greater than 25%, no greater than 20%, no greater than 17%, no greater than 15%, no greater than 10%, no greater than 7%, no greater than 5%, no greater than 3%, no greater than 2%, and/or no greater than 1% by weight of the total composition (prior to curing).

In an embodiment, the composition does not contain (that is, specifically omits) and/or is substantially free of one or both of a plasticizer and a surface active agent (surfactant). Additionally, or alternately, the composition does not contain an aromatic oil (i.e., it is substantially free of aromatic oils). However, in some embodiments, these materials may be present, as well as other additives and components.

For example, the composition may include emulsifiers. Suitable emulsifiers may include sodium pyrophosphate (tetrasodium pyrophosphate) and natural or synthetic organic emulsifiers such as tall oil resin, rosins, wood-derived resins, either chemically reacted or unreacted. Examples may include, for example, the wood resin sold as VINSOL®, derived from a pine wood resin material and UNITOL®, a tall oil resin having—COOH functionality.

In one embodiment, the composition may include a mixture of wood resin and tall oil resin in a weight ratio of wood resin to tall oil resin of about 14:1 to about 27.5:1. In those embodiments which include wood resins and/or tall oil emulsifiers it may be desirable to include a dilute aqueous hydroxide solution, such as an hydroxide of potassium, sodium, lithium, and/or organic amines.

Another additive that may be included is talc, limestone, carbon, silica or glass fibers, depending on the end us of the materials. Any talc may be used, although talc of mesh values of about 200 to about 400 may be preferred. Therefore, any materials having similar functionality may also be used, such as, for example, precipitated silica, especially with high BET surface areas.

Other additives may include fillers (such as fibers, balls or nanotubes, ground or particularized polymers, etc.), clays and other minerals (ground or otherwise particularized), pebbles, fiberglass, wood pulp, ground rubber, amidoamines, ethyleneamines, such as, e.g., diethylenetriamine, triethylenetetramine, tetraethylenepentamine, aminoethylpiperazine, adhesives, anti-strippers, dispersants, resins. Any additive or combination of additives may be used. However, in some embodiments it may be desirable to exclude any additive that has a plasticizer function, a surface active agent function, and/or an oil.

Other additives that may be incorporated into the composition include, for example, pigments and colorants, opacifiers, scents, biocidal agents, texturizing agents, desiccants and stabilizers.

The hot-melt blend may be prepared using typical melting process. Polyol may be added in the premix stage, preferably, or in letdown stage. For example, one may first combine the polyol and asphalt (or use a commercial asphalt-polyol blend), then combine the asphalt-polyol blend with the remaining components. Alternatively, the components may be combined simultaneously. Mixing may occur in a horizontal tank with agitation or in a vertical mixing tank. Mixing may be mechanical and chemical/heat facilitated. For example, a precursor blend may be prepared by mechanical mixing or compounding. The precursor blend may then be melt mixed (mixed while under heat) to form the composition, which itself may then be applied to a substrate to form a coating or layer as described below. As is known to a person of skill in the art, care must be taken in preparing such mixtures with particular attention paid to the flash point of the materials involved and the temperature at which the process is carried out and all safeguards and precautions must be observed.

The composition is prepared and applied to a substrate or surface to form a coating layer. The substrate may be of any material to which one wishes to apply a coating. Illustration examples are a road bed, asphalt slab, metal substrate, partial metal substrate, iron, steel, metal alloys (nickel, iron, chromium, etc), concrete, ceramic, plastic, or polymer. The substrate may be in any format, including vessels, pipes, slabs, boards, tiles, and may possess any geometry, e.g., arctuate, planar, corrugated planar, spherical, etc. The coating layer may be continuous or discontinuous. If the substrate takes the format of a pipe, either the interior surface of the pipe, the exterior surface of the pipe, or both, may be coated.

The composition is applied to the substrate and cured, thereby forming a coating layer. Application may be accomplished by any means in the art.

The compositions of the invention (1, 2 & 3) were prepared by incorporating the components as shown below in Table 1 (all amounts shown are percent by weight of the total composition):

TABLE 1

| Component | 1 | 2 | 3 |
|---|---|---|---|
| Asphalt | 60 | 55 | 61.55 |
| Styrene-Butadiene-Styrene polymer | 5.8 | 5 | 4.8 |
| Limestone (pulverized) | 33.2 | 38.2 | 31.65 |
| Polyol [CARPOL GP 3008] a polyol polyether | 1 | 1.8 | 2 |
| TOTAL | 100 | 100 | 100 |

A comparative composition (c1) was also prepared containing: asphalt in an amount of 68.1 wt %, Styrene-Butadiene-Styrene polymer in an amount of 6.83 wt %, limestone (pulverized) in an amount of 25.05 wt %, and no polyol component.

Each composition 1, 2 & 3 exhibits improved processability relative to the comparative composition c1.

EXAMPLE II

The compositions of the invention (4, 5 & 6) were prepared by incorporating the components as shown below in Table 2 (all amounts shown are percent by weight of the total composition):

TABLE 2

| Component | 4 | 5 | 6 |
|---|---|---|---|
| Asphalt | 78.76 | 78.76 | 78.76 |
| Styrene-Butadiene-Styrene polymer 1 (a liner SBS polymer) | 5.74 | 4.74 | 2.74 |
| Styrene-Butadiene-Styrene polymer 1 (a radial SBS polymer) | 9.96 | 8.96 | 6.96 |
| Oil | 0 | 0 | 0 |
| Polyol [CARPOL GP 3008] a polyol polyether | 5.54 | 7.54 | 11.54 |
| TOTAL | 100 | 100 | 100 |

A comparative composition (c2) was also prepared containing: asphalt in an amount of 78.76 wt %, Styrene-Butadiene-Styrene polymer 1 in an amount of 5.74 wt %, Styrene-Butadiene-Styrene polymer 2 in an amount of 9.96 by weight, oil in amount of 5.54% by weight, and no polyol (0%).

Each composition 4, 5, and 6 exhibits improved processability relative to the comparative composition c2.

EXAMPLE III

The ingredients of Table 1 are heated and mechanically compounded together. The resultant blend is poured into a lined box in a shape resembling a brick. The boxes are closed and packaged. Several bricks are delivered to a road construction project. The bricks are loaded in a hot melt mixer (melter), heated to approximately, 375° F. to 400° F. and mixed for about 10 to 15 minutes, until viscosity (qualitatively assessed) resembles a thick syrup. The composition is them coated onto the roadbed and permitted to cure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A hot melt blend composition to coat a substrate consisting of:
   a. an asphalt material up to about 85% by weight of the total composition wherein the asphalt material is a de-asphaltized grade asphalt;
   b. a polymer that is not a polyol selected from the group consisting of a natural rubber, a synthetic rubber, a thermoplastic rubber, a styrene butadiene styrene (SBS), an ethylene vinyl acetate (EVA), a thermosetting polymer, an acrylic polymer, a polyurethane polymer, a styrenated-acrylic polymer, a styrene/butadiene copolymer, an EPDM copolymer, atactic polypropylene and mixtures thereof; and
   c. a polyol selected from the group consisting of a polyether polyol, a natural polyol, a polyester polyol and mixtures thereof;
   wherein the polyol has a molecular weight of about 1000 to about 5000 and the polyol is present in an amount no greater than about 30% by weight of the total composition.

2. A hot melt blend composition to coat a substrate consisting of:
   a. an asphalt material up to about 85% by weight of the composition wherein the asphalt material is a de-asphaltized grade asphalt;
   b. a polymer that is not a polyol selected from the group consisting of a natural rubber, a synthetic rubber, a thermoplastic rubber, a styrene butadiene styrene (SBS), an ethylene vinyl acetate (EVA), a thermosetting polymer, an acrylic polymer, a polyurethane polymer, a styrenated-acrylic polymer, a styrene/butadiene copolymer, an EPDM copolymer, atactic polypropylene and mixtures thereof; and c. a polyol selected from the group consisting of pentaerythritol, ethylene glycol, glycerin, polyethylene glycol, polypropylene glycol, and poly(tetramethylene ether) glycol, polypropylene glycol, polyethylene nonyl phenol and any mixtures thereof;

wherein the polyol is present in an amount no greater than about 30% by weight of the total composition.

3. The composition of claim 1, wherein the polyol is present in an amount no greater than about 10% by weight of the total composition.

4. The composition of claim 2, wherein the polyol is present in an amount no greater than about 10% by weight of the total composition.

5. The composition of claim 1, wherein the polymer is present in the composition in an amount of no greater than about 40% by weight.

6. The composition of claim 2, wherein the polymer is present in the composition in an amount of no greater than about 40% by weight.

7. A hot melt blend composition to coat a substrate consisting of:
   a. an asphalt material up to about 85% by weight of the total composition wherein the asphalt material is a de-asphaltized grade asphalt;
   b. a polymer that is not a polyol selected from the group consisting of a natural rubber, a synthetic rubber, a thermoplastic rubber, a styrene butadiene styrene (SBS), an ethylene vinyl acetate (EVA), a thermosetting polymer, an acrylic polymer, a polyurethane polymer, a styrenated-acrylic polymer, a styrene/butadiene copolymer, an EPDM copolymer, atactic polypropylene and mixtures thereof; and
   c. a polyol selected from the group consisting of a polyether polyol, a natural polyol, a polyester polyol and mixtures thereof;
   d. a filler;
   wherein the polyol has a molecular weight of about 1000 to about 5000 and the polyol is present in an amount no greater than about 30% by weight of the total composition.

8. The composition of claim 7, wherein the filler is selected from the group consisting of bentonite, laponite, saponite, nontronite, montmorillonite, and a titanate compound.

9. A hot melt blend composition to coat a substrate consisting of:
   a. an asphalt material up to about 85% by weight of the composition wherein the asphalt material is a de-asphaltized grade asphalt;
   b. a polymer that is not a polyol selected from the group consisting of a natural rubber, a synthetic rubber, a thermoplastic rubber, a styrene butadiene styrene (SBS), an ethylene vinyl acetate (EVA), a thermosetting polymer, an acrylic polymer, a polyurethane polymer, a styrenated-acrylic polymer, a styrene/butadiene copolymer, an EPDM copolymer, atactic polypropylene and mixtures thereof; and
   c. a polyol selected from the group consisting of pentaerythritol, ethylene glycol, glycerin, polyethylene glycol, polypropylene glycol, and poly(tetramethylene ether) glycol, polypropylene glycol, polyethylene any mixtures thereof;
   d. a filler;
   wherein the polyol is present in an amount no greater than about 30% by weight of the total composition.

10. The composition of claim 9, wherein the filler is selected from the group consisting of bentonite, laponite, saponite, nontronite, montmorillonite, and a titanate compound.

11. The composition of claim 1, wherein the substrate is selected from the group consisting of a road bed and a building material.

* * * * *